Jan. 9, 1968

D. J. NESSIM ET AL 3,362,585

DRY CHEMICAL FEEDER

Filed Dec. 23, 1965

INVENTORS
DAVID J. NESSIM
GERARD P. ALBRIGHT
BY
ATTORNEY

Jan. 9, 1968

D. J. NESSIM ET AL 3,362,585

DRY CHEMICAL FEEDER

Filed Dec. 23, 1965

INVENTORS
DAVID J. NESSIM
GERARD P. ALBRIGHT

ATTORNEY

3,362,585
DRY CHEMICAL FEEDER
David J. Nessim, Warminster, and Gerard P. Albright, Hatboro, Pa., assignors to Fischer & Porter Co., Warminster, Pa., a corporation of Pennsylvania
Filed Dec. 23, 1965, Ser. No. 517,185
3 Claims. (Cl. 222—55)

ABSTRACT OF THE DISCLOSURE

A feeder mechanism for dry chemicals, the materials to be conveyed being deposited onto one end of a continuous belt through an adjustable gate whose position is controlled by a pressure-sensitive transducer coupled to a floating section disposed under the upper portion of the belt, the transducer including a strain gauge mounted on a cantilever arm which supports the floating section from a fixed section underlying the belt.

---

This invention relates generally to apparatus for conveying particulate material, and more particularly to a feeder mechanism for feeding, proportioning, batching or blending dry chemicals at closely controlled weight rates.

The main object of this invention is to provide a feeder mechanism of high accuracy and sensitivity capable of automatically conveying dry particulate materials at a rate which is readily adjustable within a wide feed range. The invention is usable for supplying dry chemicals of the type employed in chlorination plants, as well as in a broad range of other applications requiring the controlled feeding of dry chemicals or other materials in powder form.

More specifically, it is an object of the invention to provide a feeder mechanism including a continuous conveyor belt acting in conjunction with an electronic weighing system which generates a control signal serving to regulate the supply of the material onto the belt, the response of the system to changes in weight being extremely fast, whereby a substantially constant feed rate by weight is maintained.

Yet another object of this invention is to provide a U-shaped fabric belt which conveys the maximum volume of material and yet prevents side spillage without the need for side skirts or other expedients giving rise to error. A significant feature of the invention lies in the absence of tension on the belt such that the accuracy of weighing is unaffected by changes in belt speed or the character of the load.

Also an object of the invention is to provide a pressure-responsive electronic control system for automatically adjusting the weight of material supplied to the conveyor belt, the control action being continuous and not dependent on high or low switch contacts.

Still another object of the invention is to provide an alarm system to protect the feeder against overfeed or underfeed.

Briefly stated, these objects are attained in a feeder mechanism wherein the dry material is supplied by gravity onto a conveyor belt through a control gate, the belt riding over a cantilevered deck which acts on a strain gage to an extent depending on the load imposed on the deck by the weight of material conveyed thereover, the conveyor belt being driven by a motor which also provides positive power through a pair of clutches to open or close the gate, the clutches being selectively actuated by an error amplifier which is responsive to the output of the strain gage to operate a particular clutch, depending on whether the load imposed on the floating deck is less than or greater than a pre-set value.

For a better understanding of the invention, as well as other objects and further features thereof, reference is made to the following detailed description to be read in conjunction with the accompanying drawing, wherein:

FIG. 1 schematically shows in elevation a dry chemical feeder mechanism in accordance with the invention;

FIG. 4 is a transverse section taken through the conveyor belt; and

FIG. 5 is a schematic diagram of the electronic control system for the feeding mechanism.

Figure 1:
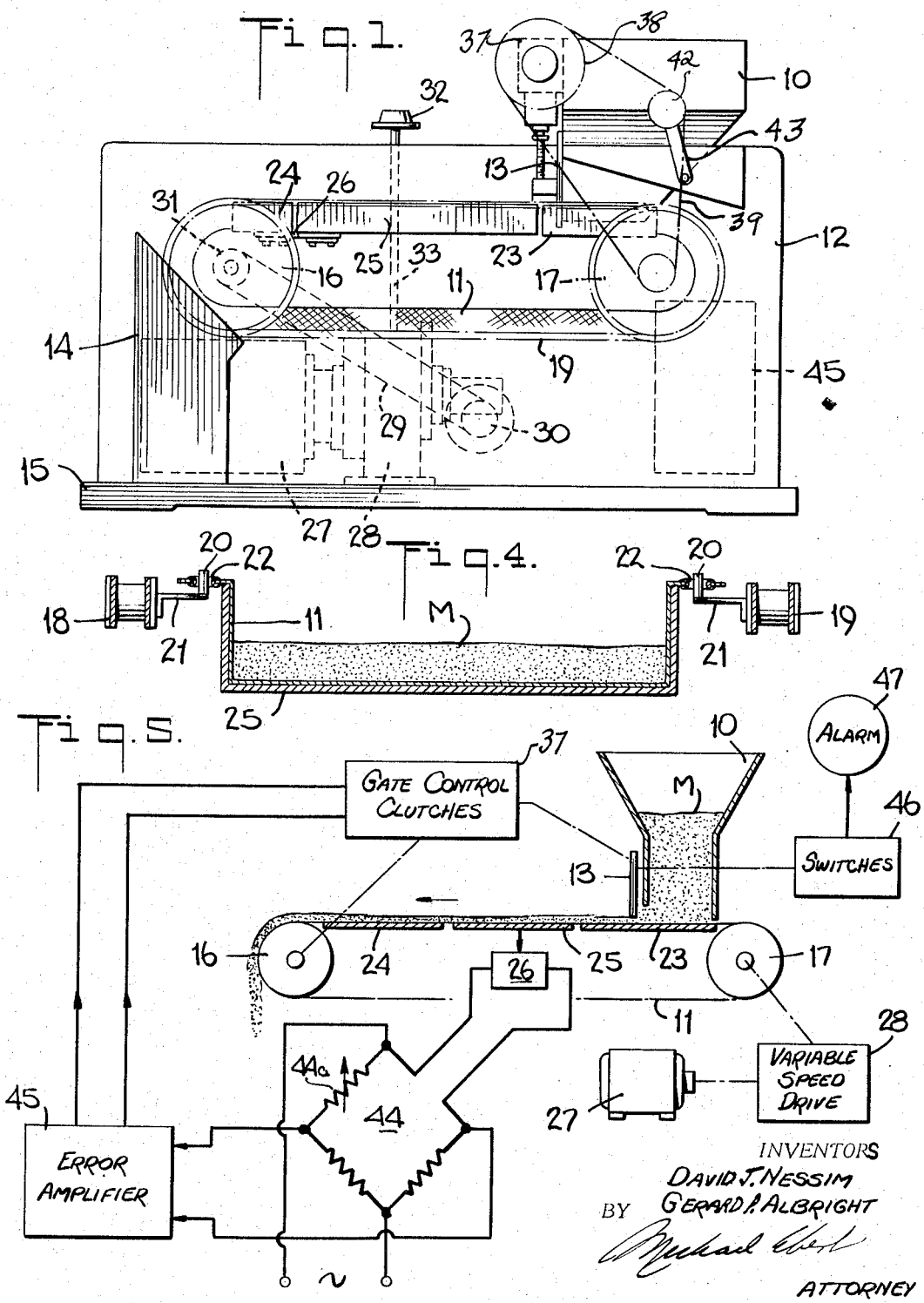
Figure 2:
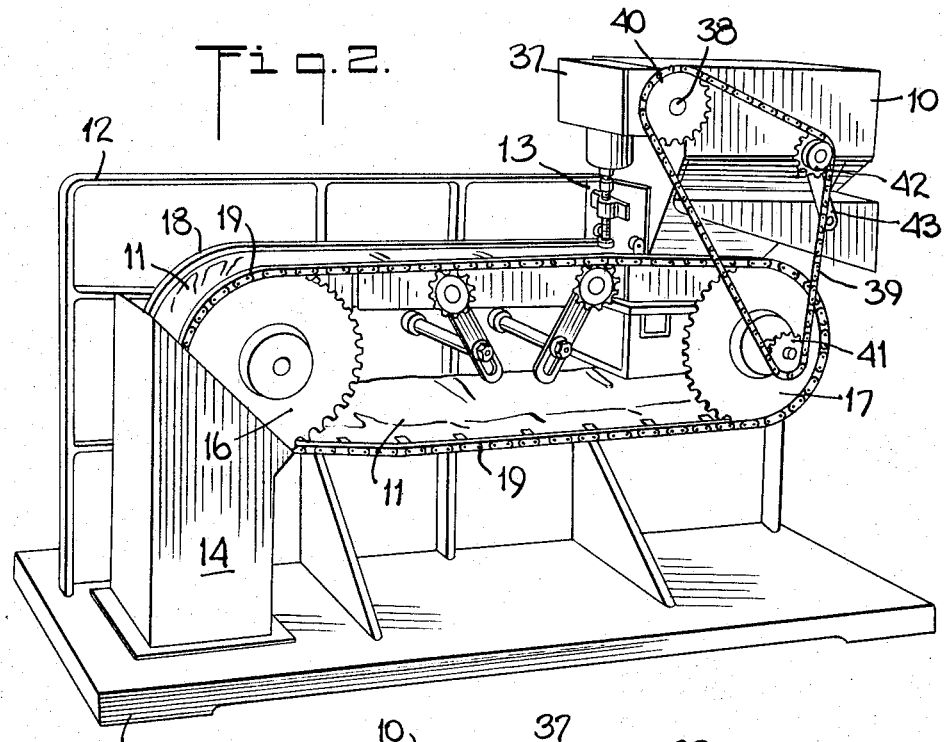
FIG. 2 is a perspective view of the mechanism as seen from one side thereof.
Figure 3:
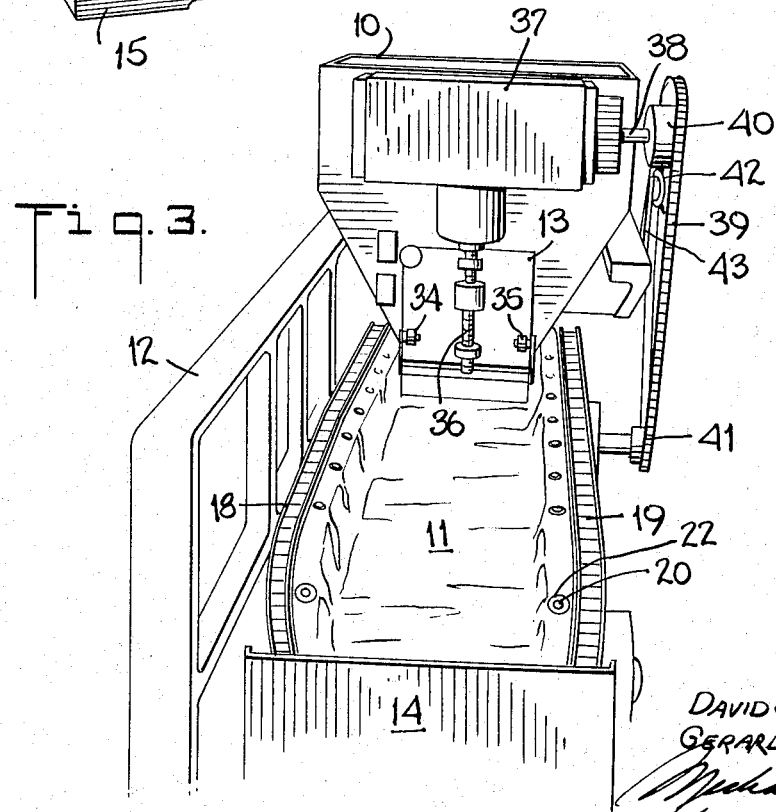
FIG. 3 is a perspective view of the mechanism looking down on the conveyor belt toward the material supply gate.

Referring now to the drawing, a feeder mechanism in accordance with the invention comprises a hopper 10 for supplying dry material M in particulate form onto one end of a continuous conveyor belt 11, the hopper being supported at the upper end of a frame 12. The amount of material supplied onto the belt is controlled by an adjustable gate 13 which is movable with respect to the lateral opening of the hopper and is adapted to control the output thereof. The dry material conveyed by the belt is dumped at the other end of the frame into a chute 14 which discharges the material through an opening in the base 15 of the frame.

The conveyor belt 11 is preferably formed of fabric woven of Teflon yarn, such material having release properties which contribute to the over-all accuracy of the feeder by assuring that all of the material is weighed. Moreover, Teflon has a low coefficient of friction and does not absorb moisture. A positive sprocket belt drive is provided, thereby obviating tracking and slippage problems. The belt drive is constituted by two pairs of main sprocket wheels 16 and 17, the pair of wheels 17 being disposed adjacent the hopper at one end of the frame, and the pair 16 being disposed adjacent chute 14.

A pair of sprocket chains 18 and 19 encircle the main sprocket wheels, the chains being provided at equi-spaced positions with upwardly-projecting pegs 20 connected by lateral arms 21 to the links of the chains. Pegs 20 are received within eyelets 22 attached at corresponding positions along the margins of belt 11.

Belt 11 is free of tension and has a U-shaped configuration, the upper horizontal portion thereof riding within a channel-shaped deck assembly extending between the sprocket wheels. The deck assembly is constituted by a stationary deck section 23 disposed adjacent hopper 10, a stationary deck section 24 disposed adjacent chute 14, and an intermediate deck section 25 cantilevered from deck section 23 by a strain gage force transducer 26. Deck section 25 effectively floats, the load imposed thereon by the weight of the dry material conveyed on the belt riding over the deck section imposing a bending force on the cantilever boom and acting to stress the strain gage.

The narrow weighing deck section combined with the high volume-per-unit-length characteristic of the U-shaped belt affords a high capacity with minimal flow space requirements. No beam and counterweight are used in the weighing system so that inertia is low and sensitivity is high.

Conveyor belt 11 is driven by a motor 27 operatively coupled through a variable-speed drive 28 to the shaft of sprocket wheel 18 by means of a belt 29. One end of belt 29 is coupled to a pulley 30 mounted on the variable-speed drive 28, and the other end to a pulley 31 on the shaft of sprocket wheel 16.

The speed at which the conveyor belt is driven, is controlled by a selector knob 32 connected through a vertical shaft 23 extending upwardly from the variable-speed drive 28. The selector knob is accessible above the frame of the machine, and the operator may therefore adjust the speed without difficulty. In practice, knob 32 may be of the multiple-turn micrometer type to provide a continuously adjustable feed rate in say a 100 to 1 feed range without gear changing.

Motor 27 also provides the motive power to operate gate 13 for controlling the supply of dry material gravity-fed by the hopper onto the conveyor belt, hence the gate-control action is proportioned to the speed of the belt. This is a valuable feature of the invention, for when the conveyor is operating at relatively high speed, it is important that a rapid control action be effected to maintain a substantially constant flow rate.

The manner in which the motor operates the control gate is as follows. Gate 13 is slidable vertically against the lateral discharge opening of hopper 10, the gate being pressed against the side of the hopper by spring-biased rollers 34 and 35. The opening and closing of the gate is carried out by a drive screw 36 operated through a double clutch mechanism 37 having an input shaft 38. Shaft 38 is operatively coupled to motor 27 by means of a sprocket chain 39 which engages a sprocket wheel 40 keyed to shaft 38, the chain also engaging a sprocket wheel 41 keyed to the shaft of the main sprocket wheel 17. An idler sprocket wheel 42 mounted on an adjustable arm 43 acts to maintain the chain taut.

The double clutch mechanism 37 is electromagnetically actuated, the arrangement being such that when one of the clutches is energized, the drive screw 36 operates in one direction to close the gate, and when the other clutch is energized the drive screw rotation is reversed to open the gate. The nature of the double clutch mechanism forms no part of the present invention, such mechanisms being known per se.

Strain gage pressure transducer 26 consists of an elastic element that converts pressure into displacement, and wire resistance strain gages for measuring the displacement. The elastic element is the cantilever beam which supports the weighing deck 25.

The strain gage resistance element is connected in one arm of a Wheatstone bridge 44, whose output is applied to an error amplifier 45. The bridge is so adjusted by a manually set potentiometer 44a in one arm thereof such that when the strain gage has a resistance reflecting a predetermined weight of dry chemical on the weighing deck 25, the bridge is balanced and the output is null. When, however, the weight differs from the predetermined value, the bridge is unbalanced to produce an error signal whose amplitude is proportional to the degree of deviation from the predetermined weight value and whose phase or polarity depends on the direction of deviation, that is, whether the deviation falls below or rises above the pre-set value.

The amplified output of the error amplifier 45 is applied to the gate control clutches 37 such that when the error signal reflects a drop in weight below the desired value, the electromagnetic clutch is energized which causes the gate to open further, thereby increasing the gravity flow of material onto the belt until such time as the weight thereof reaches the intended value, at which point the error signal is insufficient to operate the clutch.

Similarly, when the error signal reflects an increase in weight above the desired value, the other clutch is energized to move the gate in the closing direction until such time as the supply of material is reduced to a point at which the error signal is insufficient to energize the clutch.

For over-feed and underfeed protection, the gate 13 is equipped with sealed high and low limit microswitches 46 which actuate an alarm light 47. Optionally, remote audible alarms may be provided when the gate is driven to either limit of its travel.

In practice, the frame 12 is preferably made of cast aluminum, the deck assembly being fabricated of stainless steel lined with Teflon tape to minimize belt friction. The feeder is suitable for proportional control with a pulse duration signal. The variable-speed drive can be equipped with a pneumatic positioner for proportioning control. In practice, the weighing and feeding sections may be enclosed in a dust-tight housing, with the top and one side made of clear plastic to permit observation of the operation.

To summarize the operation of the feeder mechanism, material M from the hopper 10 feeds by gravity onto the conveyor belt 11. Below the hopper, the belt rides on a stationary deck assembly having a cantilevered floating section 25. As the belt moves forward, it passes beneath the electrically controlled gate 13, the raising and lowering thereof governing the amount of material carried by the belt. The belt then carries the material over the weighing deck section 25, the weight of the portion of the belt and the material on the cantilevered weighing deck being continuously sensed by the strain gage transducer 26.

Any deviation of the weight from the pre-set value upsets strain gage bridge 44, creating an error signal which is amplified by amplifier 45 to cause one or the other of the two electromagnetic clutches 37 to be energized. When either clutch is engaged, it causes the vertically-movable gate to open or close to restore the weight of material on the belt to the proper level and thereby to rebalance the bridge. The belt drive motor 27 supplies the power for operation of the gate, whereby the gate control action is proportional to belt speed.

While there has been shown and described a preferred embodiment of dry chemical feeder in accordance with the invention, it will be appreciated that many changes and modifications may be made therein without, however, departing from the essential spirit of the invention as defined in the annexed claims.

What we claim is:

1. A feeder mechanism for particulate material, said mechanism comprising:
   (a) a continuous conveyor belt,
   (b) a gravity hopper supplying material onto one end of said belt for conveyance to a discharge position at the other end thereof, said hopper having an opening,
   (c) a gate movable with respect to the hopper opening to vary the size thereof,
   (d) a deck assembly disposed below the upper portion of said belt and including a fixed section and a floating section,
   (e) means to support said belt over said deck assembly without tension and to move same thereover,
   (f) a pressure-sensitive transducer coupled to said floating section to measure the load imposed thereon by the material conveyed thereover by said belt to produce a control signal proportional thereto, said transducer including a resilient cantilever beam which supports said floating section from said fixed section and a strain gauge responsive to the flexure of said beam to produce said control signal, and
   (g) means responsive to said control signal to adjust the position of said gate to maintain the flow of said material at a pre-set rate.

2. A mechanism as set forth in claim 1, wherein said belt is driven at a variable speed by a motor which also supplies the motive power for said gate whereby the gate control action is proportional to the speed of the belt.

3. A mechanism as set forth in claim 1, wherein said belt is U-shaped and is supported between a pair of spaced sprocket chains having pegs connected to the links thereof, said pegs being receivable in correspondingly positioned apertures in the margins of the belt.

References Cited
UNITED STATES PATENTS

| | | | |
|---|---|---|---|
| 1,155,340 | 10/1915 | Davis | 198—194 |
| 1,559,772 | 11/1925 | Peale | 198—191 |
| 2,343,722 | 3/1944 | Wagner | 222—55 |
| 2,662,665 | 12/1953 | Harper | 222—55 |
| 2,917,207 | 12/1959 | Prowse et al. | 222—55 |
| 2,984,386 | 5/1961 | White | 222—58 |
| 3,110,419 | 11/1963 | Atkins et al. | 222—55 |
| 3,187,944 | 6/1965 | Stock | 222—25 |

ROBERT B. REEVES, *Primary Examiner.*

HADD S. LANE, *Examiner.*